Figure 1:
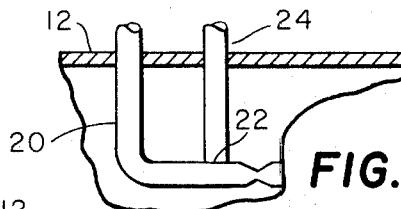
Figure 1:
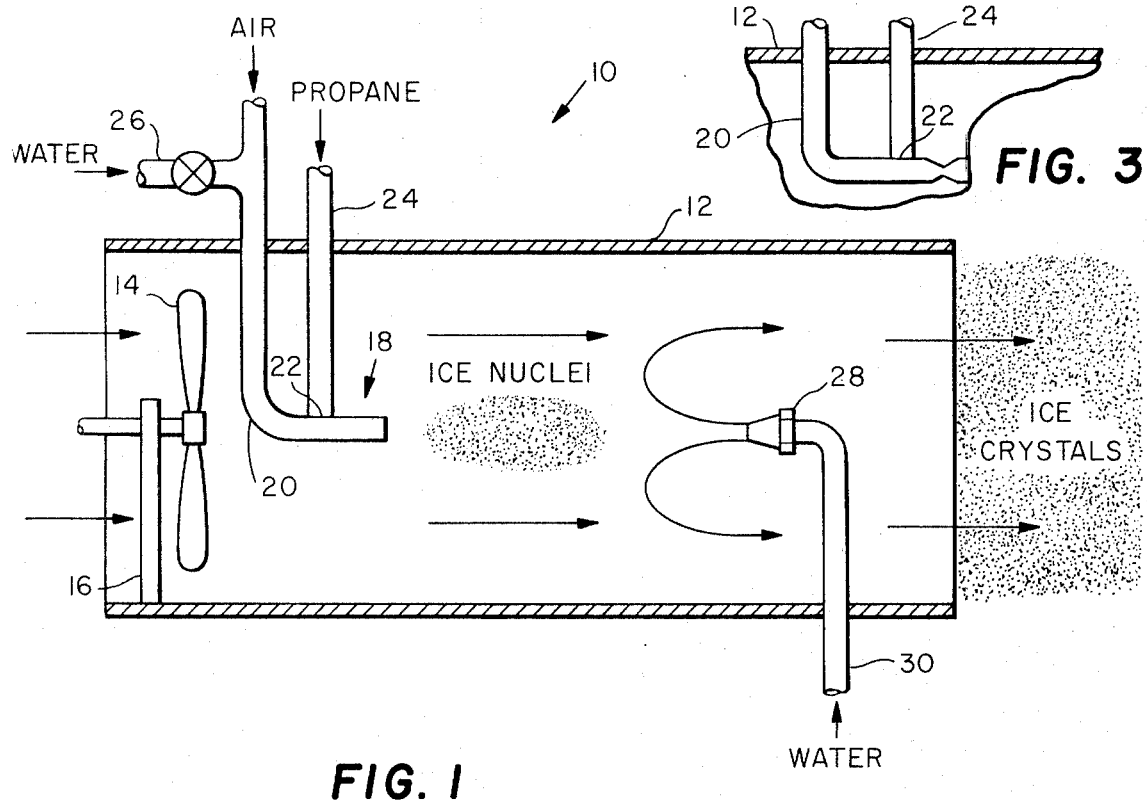

United States Patent [19]
Eustis et al.

[11] 3,733,029
[45] May 15, 1973

[54] SNOW PRECIPITATOR

[75] Inventors: William E. C. Eustis, Cambridge; Wallace E. Howell, Lexington, both of Mass.

[73] Assignee: Hedco, Inc., Paramus, N.J.

[22] Filed: July 23, 1971

[21] Appl. No.: 165,689

Related U.S. Application Data

[62] Division of Ser. No. 854,103, Aug. 29, 1969, abandoned.

[52] U.S. Cl. .................................................. 239/14
[51] Int. Cl. ...................... A01g 15/00, E01h 13/00
[58] Field of Search ............................ 239/2, 25, 14

[56] References Cited

UNITED STATES PATENTS

| 2,968,164 | 1/1961 | Hanson | 239/2 S |
| 3,010,660 | 11/1961 | Barrett | 239/2 S |
| 3,301,485 | 1/1967 | Tropeano et al. | 239/2 S |

FOREIGN PATENTS OR APPLICATIONS

| 1,372,024 | 8/1964 | France | 239/2 S |

*Primary Examiner*—Lloyd L. King
*Attorney*—Richard P. Crowley, et al.

[57] ABSTRACT

A snow-making apparatus wherein ice nuclei are generated by spontaneous nucleation in a separate, distinct nucleation zone. Water, slightly above the freezing temperature, is discharged through a nozzle and broken up into water droplets. The water droplet formation and ice nucleation formation are separately controlled. A propeller at one end of the housing moves an air mass through the housing to mix the ice nuclei and water droplets. The water droplets are infected with the ice nuclei, the ice-infected water droplets discharged into the atmosphere, and snow-like particles ultimately fall to the ground. Structure is provided to control separately each of the steps; namely, ice nuclei formation, the water droplet formation, and the flow of the air stream.

12 Claims, 3 Drawing Figures

SNOW PRECIPITATOR

CROSS-REFERENCE TO RELATED APPLICATION

This application is a divisional of U.S. Pat. application Ser. No. 854,103, filed Aug. 29, 1969, now abandoned.

SUMMARY OF THE INVENTION

The purpose of a snow-making apparatus is to emit at least partially frozen particles which will gather on the ground as a more or less loose snow-like mass suitable for skiing. An essential property of any snow-making device is that it effects the initiation of the freezing process in a large proportion of the water particles generated, otherwise the spray produces an artificial ice storm.

In the state of the art today, the proper role of nucleation as the necessary initiation of freezing has not generally been recognized or clearly identified. The prior art in at least one instance discloses combining compressed air and pressurized water in a helically moving chamber and discharging the mixture through a nozzle. Upon discharge, the mixture forms ice crystals. (See U.S. Pat. No. 3,301,485) Also, a mixture of water and crushed ice discharged through a nozzle into an ambient stream of air at less than 0° C. to precipitate snow crystals has been suggested. (See U.S. Pat. No. 2,968,164)

The primary drawbacks of the present methods and apparatus for snow making are that the nucleating portion of the snow-making process and the crystallization of the water droplets in the air stream have been performed substantially simultaneously or more or less accidentally by unrecognized "brute force," without regard to controlling the sets of parameters which affect each step in the process. This results in uneconomical and inefficient apparatus for making snow, with the attendant high cost.

To form frozen particles more is required than simply the cooling of the water to a temperature below 0° C. in the course of its emission and subsequent fall, for water when it is cooled below 0° C. does not start to freeze until a nucleus of the frozen phase appears. This nucleus may arise through collision between the cooling water particles and a bit of natural ice (isomorphic nucleation), or through the action of a foreign particle of some other substance, the crystalline, molecular, or other structure of which somewhat resembles ice or otherwise effects the onset of the ice phase (heterogeneous nucleation), or through cooling of the liquid phase to such a low temperature that the ice phase appears spontaneously without the introduction of any foreign matter (homogeneous nucleation), which in water at atmospheric pressure occurs at about −40° C. Unless the onset of freezing is initiated in one of these three ways, the water particle below 0° C. remains in a supercooled state until it strikes the ground, where it freezes in the form of glaze or ice, generally too hard for skiing and too rough for skating.

In our invention, the production of ice nuclei is separated from the function of disintegrating the water stream and of cooling the resulting water droplets and is accomplished by cooling of moist air below the temperature of homogeneous nucleation in a separate zone, either by adiabatic expansion of moist compressed air in an efficient nozzle, or by injection into moist cold air of a refrigerant, such as liquid propane, or both; and the zone is so designed as to permit ice nuclei to grow to such a size that they may survive the few fractions of a second during which they are to become mixed with the droplet spray.

Likewise, the zone in which the droplet spray is generated is so designed that the bulk water may be brought to a temperature just barely above 0° C. before leaving a nozzle and may be mixed with a stream of cold air and so be brought to a supercooled state within a very short distance after leaving the nozzle. After each separate step has been accomplished, mixture of the drop spray with the nucleus cloud is then effectuated. Finally, the spray is mixed with a rapidly moving air stream propelled from a blower in such a way as to spread it through a large volume of the atmosphere, with which it exchanges latent heat during the freezing of the drops. The ice crystals then formed fall to the ground as more or less completely frozen snow-like particles.

Accordingly, in our invention the individual steps required for making snow are each controlled to ensure economic and efficient results.

BRIEF DESCRIPTION OF THE DRAWINGS

FIG. 1 is a schematic and partially sectional view of our snow precipitator; and FIG. 2 is an alternative embodiment of our invention; and FIG. 3 is a further alternative embodiment of our nucleating chamber.

DESCRIPTION OF THE PREFERRED EMBODIMENT

Referring to FIG. 1, the snow precipitator is shown generally at 10 and includes a housing or tunnel-like conduit 12 together with a propeller or fan 14 secured to the housing by a bracket 16, to move air through the housing and carry the ice crystals into the atmosphere. Disposed in the downstream or high pressure side of the propeller 14 is a nucleating zone 18 used to form the ice nuclei. The zone 18 comprises a feed conduit 20 for the introduction of a moist air stream and a diaphragm 22 to provide for the introduction of propane, or similar gas, into the moist air stream. The conduit 20 passes through the housing and as shown is L-shaped. The diaphragm 22 is disposed in the discharge end of the conduit 20 and further is connected to a conduit 24 which passes through the housing 12. In communication with the conduit 20 is a feed line 26 to bleed water into the air stream.

Located downstream of the propeller 14 or on the high pressure side and axially spaced apart from and generally axially aligned with the nucleating zone 18 is a nozzle 28 which faces into the direction of the flow of air created by the propeller 14. The nozzle is connected to a water supply by conduit 30 which passes through the housing 12. Water flowing through the conduit 30 and the nozzle 28 is broken up into droplets.

In the operation of the snow precipitator, the propeller 14 is actuated by a motor or other means (not shown) to move ambient air at less than 0° C, and at atmospheric humidity through the housing. Compressed air at any humidity, including a high humidity, and at a convenient pressure, say 10 to 15 psi, is introduced into conduit 20. Water at a rate determined by the relative humidity of the atmosphere but typically perhaps of from 0.1 quarts to 20 quarts/minute is bled into the compressed air through feed line 26. Liquid propane at a rate determined by the desired production rate of snow and typically from about 0.5 to 15 lbs/hour, say for example 2 lbs/hour, is discharged through the diaphragm 22, which has an orifice of about 0.010 inches, and into the saturated air stream. When discharged into the air stream the propane goes through a phase change into gas and absorbs heat from the air stream. If desired, other expanding gases or refrigerants which have a high heat of vaporization and would lower the temperature of the air stream to below about $-40°$ C. on expansion or in a phase change may be used. For example, other hydrocarbons like butane, ethane, methane, and other liquified gases such as liquid oxygen, halocarbons like freon, carbon dioxide, etc. may be used, as well as ammonia, and sulfur dioxide. The refrigerant may incur a phase change from a liquid to a gas or may simply be an expanding gas. Other typical refrigerants are set forth in the *Handbook of Chemistry and Physics*, 47th Edition, Section E, pages 17–25.

The expanding propane cools a portion of the saturated air below $-40°$ C. and causes the formation of generally uniform ice nuclei by homogeneous nucleation within the air stream. The average particle size of the ice nuclei formed without addition of bleed water is generally between about 0.1 to 10 microns, say for example less than 1 micron, and with bleed water may be increased to between about 125 to 250 microns, say for example 150 microns. The nuclei are then discharged into the air stream.

Water enters the conduit 30 and flows through the nozzle at any temperature in excess of $0°$ C. and generally between $1°$ to $15°$ C, say about $4°$ C, at a rate of between 1 to 300 gallons/minute, for example 15 gallons/minute, and is forced through the nozzle 28 at any rate to produce the desired particle size between about 40 and 100 psi, for example 80 psi. This temperature is advantageous in that it prevents anchor ice from forming in the conduit 30 and in the nozzle. The nozzle breaks the water into droplets of suitable size, say between 100 and 500 microns, for example about 200 microns, and they are discharged countercurrent and directly into the flow of air and ice nuclei. The droplets are supercooled to below $0°$ C. by the ambient air flowing through the housing.

These supercooled droplets are then infected by collision with the ice nuclei previously formed which have traveled a short distance, say between 2 to 8 inches. When a drop is infected with an ice nuclei, spicules of ice form very rapidly within it, releasing latent heat until the droplet becomes an ice water mixture at a temperature of about $0°$ C. remaining at this temperature until the freezing process is completed through the exchange of heat to the surrounding atmosphere. This exchange of heat with the surrounding atmosphere progressively continues both while the droplet is within the precipitator and after the ice crystals are discharged from the end of the housing into the atmosphere where the freezing process is continued until the droplet is all or largely all frozen and the particles fall to the ground as snow.

It has been found advantageous to spray the water drops countercurrent to the flow of ice nuclei and ambient air since the probability of collision between the drops and the nuclei is significantly enhanced. Also, the effective velocity of the drops relative to the countercurrent flow of air is increased; and, accordingly, the rate of heat exchange between the drops and the surrounding air is about three times greater than in concurrent operation, hastening the supercooling process.

Although the nucleating zone 18 has been shown to include an L-shaped conduit with the diaphragm located near the discharge end of the conduit carrying the moist air, it is possible for it to take other forms. For example, the moist air may flow through a venturi passage and the refrigerant injected prior to the constriction as shown in FIG. 3, at the constriction, or just beyond the constriction. Also the nucleating zone may be of a nonunitary construction and the diaphragm disposed adjacent to the discharge end of the conduit 20.

When compressed air is allowed to expand adiabatically, the temperature of the air falls about $10°$ C. for each 8 percent decrease in pressure. Therefore, if the air is initially at a temperature near $0°$ C. expansion from a modest pressure of 20 lbs/inch is more than sufficient to bring the temperature below $-40°$ C. If the atmospheric air initially has a relative humidity higher than about 50 percent, it will become saturated in the course of this expansion. In this situation, in the initial instant after the temperature falls below $-40°$ C, very large numbers of very small ice nuclei, say for example in the range of 40 to 60 angstroms, form spontaneously.

Figure 2:
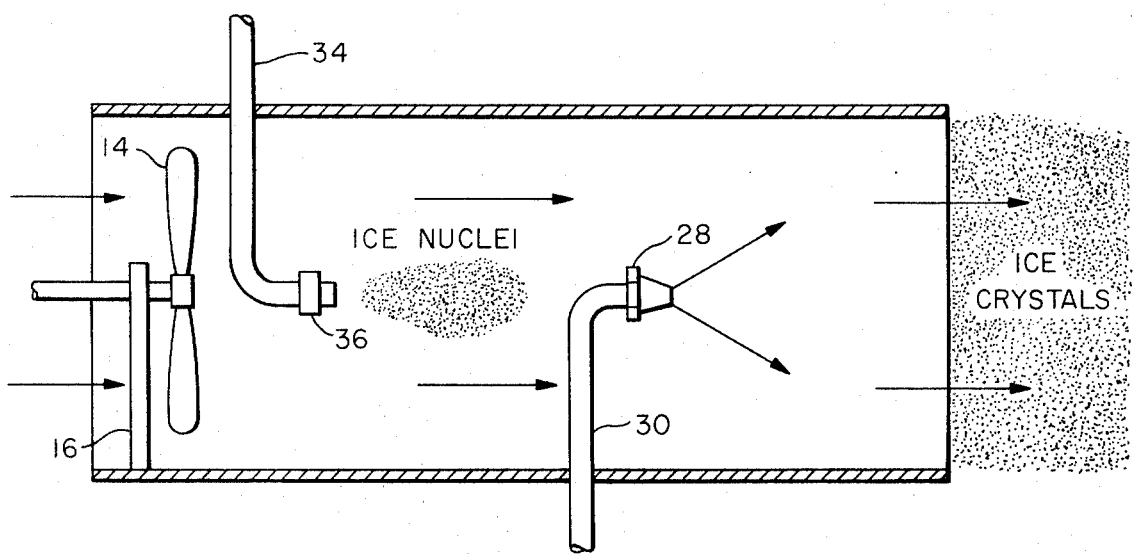

Accordingly, in FIG. 2 in an alternative embodiment of the invention the nucleating zone comprises a feed conduit 34 and a nozzle 36 in communication with the conduit 34. The nozzle 36 is adapted to release saturated compressed air through a nozzle to spontaneously form ice nuclei. Also, in this embodiment the flow of air and ice nuclei may be concurrent with the flow of the drops discharged from the nozzle 36. Again, the efficient economic operation is provided when the formation of ice nuclei and the water drops are separately created and then combined to form the ice-infected droplets.

Our invention has been described in reference to homogeneous nucleation when a refrigerant such as propane or carbon dioxide is injected into a stream of saturated air to lower the temperature to below about $-40°$ C. to form the ice nuclei as shown in FIG. 1 or when compressed air is cooled by expansion as shown in FIG. 2. It is also within the scope of this invention that heterogeneous or isomorphic nucleation may be used to form the ice nuclei in the nucleating chamber, as for example by the introduction of silver iodide smoke or comminuted natural ice. Referring again to FIG. 1, the saturated air stream flows through the feed conduit 20 at a temperature of less then $0°$ C. A finely foreign nucleating agent such as a solid particle or product like a silver salt such as silver iodide is injected into this air stream such as through line 26. The silver iodide or other nucleating agent initiates the formation of ice crystals in a supercooled saturated air stream. Also, the air stream may be treated with foreign crystalline substances which may normally have a hemimorphic hexagonal crystalline structure similar to that of ice. For example, wurtzite has been found to be satisfactory. Also various natural minerals in a finely divided state may be similarly employed to initiate crystallization in the supercooled air stream; namely, zincite, nephelite, and lead iodide may also be used. If desired, ice nuclei per se may also be injected into the saturated stream. Also, certain resinous compounds, such as urea, have also been effective.

Although our invention has been described in reference to particular embodiments wherein the steps for the formation of ice nuclei and water droplets are controlled separately, it is to be understood that although the embodiments described showed a single nucleating zone and nozzle, there may be employed in a particular operation a plurality of nucleation zones and nozzles within a housing and the orifice sizes may vary. Also depending upon the amount of snow to be generated, the flow rates of compressed air, propane, bleed water, ambient air, etc., will vary.

Having described our invention, what we now claim is:

1. An apparatus for the formation of snow which comprises in combination:
   a. tunnel-like housing means;
   b. means to move large masses of air through the housing means to provide an air stream;
   c. means to form ice crystals in communication with the air stream, which means includes;
      i. a conduit for the flow of a moist stream of air, and
      ii. means to cool the air stream whereby ice crystals are formed;
   d. means to form water droplets disposed within the air stream and spaced apart from the means to form ice crystals; and
   e. a source of water in communication with the means to form the water droplets whereby the ice crystals generated by the nozzle infect the water droplets and the air mass progressively removes the latent heat from the ice-infected water droplets until they are in a snow-like state.

2. The apparatus of claim 1 wherein the means to form ice crystals includes a separate conduit in communication with the conduit for the moist air stream said second conduit adapted to introduce a refrigerant into the moist air stream whereby the refrigerant cools the moist air stream to below about −40° C. to form ice crystals by homogeneous nucleation, which ice crystals are discharged into the air stream.

3. The apparatus of claim 1 wherein the means to move large masses of air through the housing includes propeller means which means has a high pressure side and a low pressure side, the means to form ice crystals is disposed adjacent the high pressure side of the propeller means.

4. The apparatus of claim 3 wherein the means to form water droplets includes nozzle means and said nozzle means is disposed on the high pressure side of the propeller means and is axially spaced apart from the means to form ice crystals and further said nozzle means is adapted to direct the water droplets in a direction countercurrent to the flow of the air mass and the ice nuclei stream.

5. The apparatus of claim 1 wherein the means to form ice crystals is disposed within the housing.

6. An apparatus for the formation of snow which comprises in combination:
   a. tunnel-like housing means;
   b. means to move large masses of air through the housing means to provide an air stream;
   c. means to form ice crystals in communication with the air stream, which means includes;
      i. a conduit for the flow of a stream of moist compressed air, and
      ii. a nozzle adapted to expand adiabatically the compressed air whereby ice crystals are formed;
   d. means to form water droplets disposed within the air stream and spaced apart from the means to form ice crystals; and
   e. a source of water in communication with the means to form the water droplets whereby the ice crystals generated by the nozzle infect the water droplets and the air mass progressively removes the latent heat from the ice-infected water droplets until they are in a snow-like state.

7. The apparatus of claim 6 wherein the means to move large masses of air through the housing includes propeller means which propeller means has an upstream and a downstream side.

8. The apparatus of claim 7 wherein the means to form water droplets includes at least one nozzle and said nozzle is disposed on the downstream side of the propeller means.

9. The apparatus of claim 7 wherein the nozzle to form ice crystals is disposed on the downstream side of the propeller means.

10. The apparatus of claim 7 wherein the nozzle to form ice crystals and the means to form water droplets are both disposed on the downstream side of the propeller means and the means to form water droplets, the nozzle to form ice crystals positioned intermediate the propeller means and the means to form water droplets.

11. The apparatus of claim 6 wherein the nozzle to form ice crystals is disposed within the housing.

12. An apparatus for the formation of snow which comprises in combination:
   a. a tunnel-like housing;
   b. a propeller adjacent one end of the housing to move large masses of air through the housing to provide an air stream;
   c. means to form ice crystals disposed in the housing which means includes;
      i. a conduit for the flow of a stream of moist compressed air;
      ii. a nozzle adapted to expand adiabatically the moist compressed air to form the ice crystals;
   d. at least one nozzle to form water droplets disposed within the airstream and spaced apart the means to form ice crystals and the propeller whereby the means to form the ice crystals is intermediate the propeller and the nozzle which forms the water droplets; and
   a source of water in communication with the means to form the water droplets whereby the ice crystals generated by the nozzle infect the water droplets and the air mass progressively removes the latent heat from the ice-infected water droplets until they are in a snow-like state.

* * * * *